United States Patent Office 3,035,598
Patented May 22, 1962

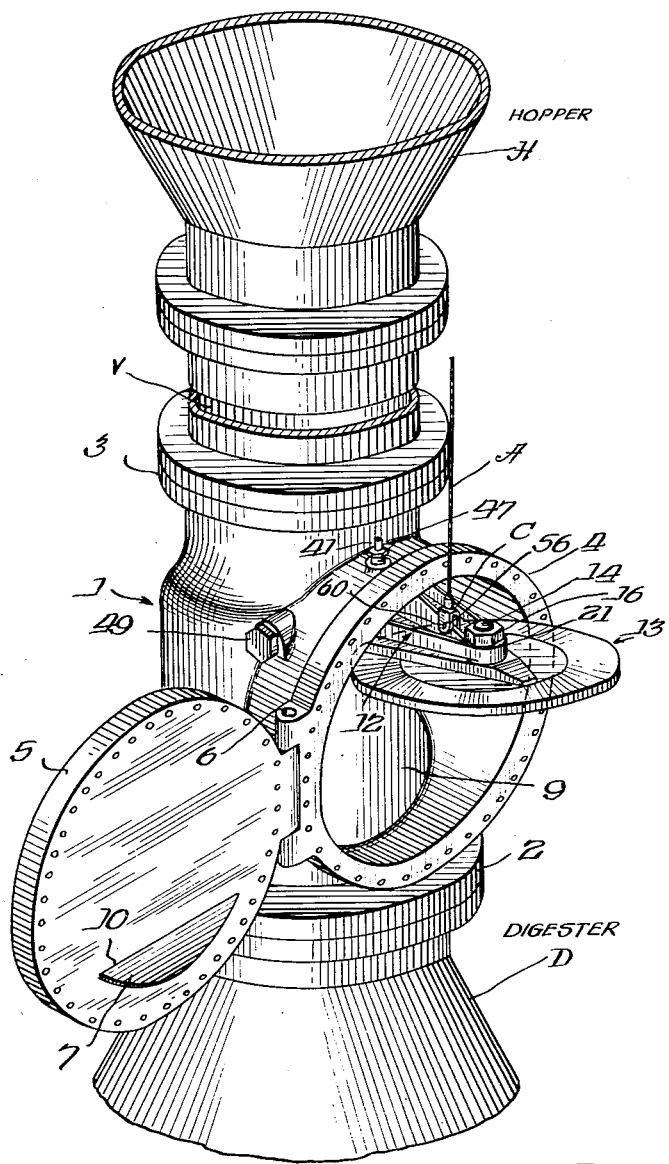

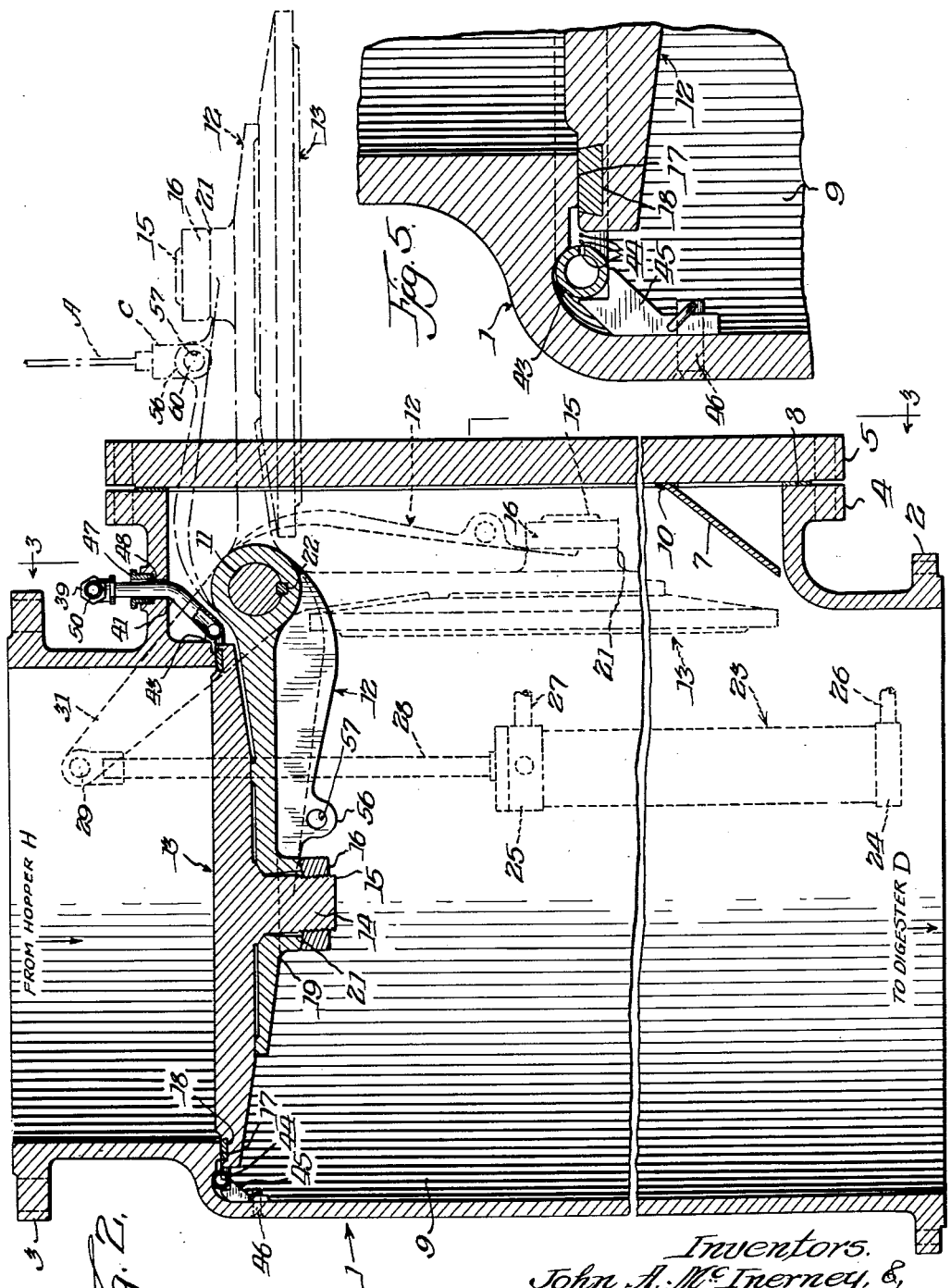

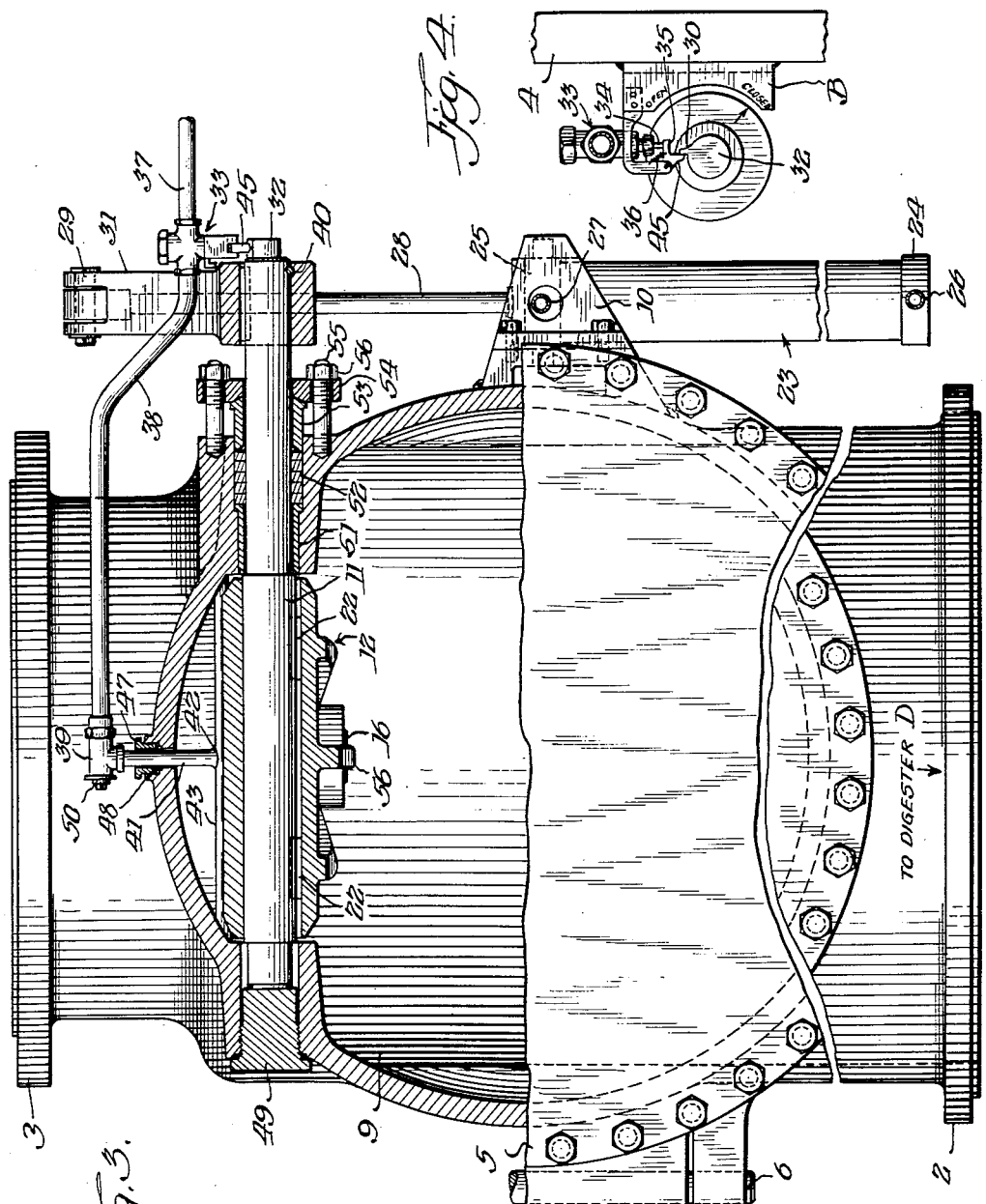

3,035,598
DIGESTER CAPPING VALVE
John A. McInerney, Evergreen Park, and Kurt B. Bredtschneider, Chicago, Ill., assignors to Crane Co., Chicago, Ill., a corporation of Illinois
Filed Mar. 26, 1959, Ser. No. 802,096
7 Claims. (Cl. 137—240)

This invention relates generally to valves, and more particularly it is concerned with a valve construction termed by those skilled in the art as a digester capping valve primarily for use on pulp stock lines in connection with the manufacture of paper, but as will hereinafter become apparent having application for other services in which the problems encountered are similar.

It is well known in the manufacture of paper and specifically in the handling of wood chips for processing in a pulp digester in process steps preliminary to manufacturing paper that the ordinary gate valves or globe valves available are not suitable for the service encountered. It has become necessary in order to meet severe conditions to provide valves with unique functional and structural elements.

It is one of the more important objects of this invention therefore to provide for a digester pulp handling valve in which arrangement is made not only to maintain the valve conveniently in good operating condition, but also to provide for convenient means of access for purpose of inspection, cleaning, and repair whenever necessary.

A further object is to provide for a valve construction in which the seat thereof is flushed and cleaned preferably just before actual seating of the valve is accomplished.

Another object is to provide for a seat flushing mechanism for a swing gate valve or the like in which the cleaning operation is timed with the closing of the valve automatically so that the desired flushing of the valve seat and the disc or closure member takes place without the need for any special attention by the valve operator, maintenance people or others in this regard.

A further object is to provide for a valve construction in which substantially the entire seating periphery of the valve seat and closure member are cleaned or flushed simultaneously thereby to minimize the possibility of even relatively slight pipe line accumulations remaining on the valve seat or closure member facing or both.

Another object is to provide for a valve construction in which cleaning of the valve seating contacts is done more effectively than heretofore and relatively more economically.

A further object is to provide for a valve construction in which a valve seat cleaning mechanism lends itself to easy inspection of the valve interior during operation and without necessity for removing it from the pipe line and yet permit thorough inspection to be made as if the valve were actually disassembled.

Other objects and advantages will become more readily apparent upon proceeding with the following descripion read in light of the accompanying drawings, in which:

FIG. 1 is a fragmentary exterior view of one preferred mounting of the digester capping valve embodying our invention;

FIG. 2 is a transverse sectional assembly view of the valve embodying our invention;

FIG. 3 is a sectional view taken on the line 3—3 of FIG. 2;

FIG. 4 is a reduced exterior view showing a preferred form of flush actuating mechanism for the valve to effect the seat cleaning operation; and FIG. 5 is a magnified fragmentary sectional view of one preferred form of flushing mechanism.

Similar reference numerals refer to similar parts throughout the several views.

Referring now to FIG. 2, a conventional swing gate valve casing is shown generally designated 1 having the usual flange end connections 2 and 3 for bolted attachment respectively to the pulp digester D at one end and to the hopper H, the arrangement being shown more clearly in FIG. 1. The casing at its side portion is provided with a flange 4 to receive bolts (not shown) for a cover 5. If desired, for ready inspection, the cover 5 may have a window (not shown) to view the valve interior while it is in service. The said cover for convenience is suitably hinged to a side portion of the flange 4 as shown also in FIG. 1 by means of a hinge pin 6.

As indicated by the V, a stop valve (not shown) may be interposed immediately below the hopper H to support the contents of the hopper, or for measuring the amount of such contents to be passed on to the valve casing 1 below it.

On the inner surface of the cap 5, it has been found desirable to mount a baffle 7 welded or otherwise attached as at 10 to the cap 5 for reasons hereinafter explained. The usual fluid sealing gasket 8 is applied to the annular surfaces between the flange 4 and the cover 5, as more clearly shown in FIG. 2.

The valve chamber 9 at an upper corner portion thereof is provided with a transversely extending hinge rod or pin 11, upon which is supported a closure member hinge generally designated 12, from which is journalled the swing gate closure member generally designated 13. The said closure member, as indicated, is provided with a threaded shank 14 threaded as at 15 to receive the retaining hinge nut 16. The swinging closure member 13 in its upper limit of movement as illustrated seats upon the casing annular seat portion 17 and it may preferably, although not necessarily, have the soft seating contact member illustrated at 18. The connection of the hinge 12 with the closure member 13 is preferably provided with clearance so that the hub 19 as at 21 has spheroidal type of surface to permit of slight tiltability of the closure member in the course of making its contact with the casing seat 17. The hinge pin or rod 11 is held non-rotatably relative to the hinge 12 by means of the locking key 22.

On the exterior of the valve, for purpose of applying power to enable the swinging closure member 13 to be actuated to and from its seat 17, a double acting piston and air cylinder is employed which is generally designated 23 and has the usual capped ends 24 and 25 with the air bleeder connections 26 and 27 as illustrated more clearly in FIG. 3. The outer driving extension 28 of the piston (not shown) is pivotally attached as at 29 to the valve actuating lever 31. Thus, when viewed in FIG. 2 (see dotted lines), as the lever 28 is moved longitudinally in a direction toward the right under the influence of the piston in the air cylinder, it will be apparent that the lever 31 will be arcuately moved pivoting on the extension 32 of the hinge pin 11, and being locked on said extension by the lock pin 40 (see FIG. 3). As the rotation takes place of the hinge pin 11 and its extension 32, it will be apparent that the valve closure member 13 and its hinge 12 will ultimately move to the uppermost position as indicated by the dotted lines in FIG. 2.

As to the manner in which the rotation of the closure member hinge extension 32 cooperates with the means to predeterminately spray clean and flush the valve seats at 17 and 18, reference should be made to the construction shown more clearly in FIGS. 3 and 4, what is termed in the trade as a quick-opening spray valve 33 is shown, mounted on a bracket B on the back of the main valve flange 4 to assume the general arrangement and positioning shown in FIG. 3. The quick-opening valve 33 is provided with the usual slidably mounted reciprocably movable stem 34, which as shown more clearly in FIG. 4 has its outer projecting end portion bearing against the pivotally mounted cam-actuated L-shaped pawl 35 which is preferably spring-biased as at 36. As will be apparent the actual depression of the valve stem to open the valve 33 occurs when the shaft extension 32 is rotated clockwise (valve is being closed) and the pawl surface 45 passes over the lug surface 30 of the shaft 32. Preferably this contact occurs to coincide with the valve being about to close.

As shown in FIG. 3, the valve 33 is connected to a source of fluid supply preferably hot steam (other cleaning media may be used) by means of a conduit 37 and an outlet conduit 38 from the valve. The outlet conduit as shown is connected to a T 39, the latter fitting having a side outlet conduit 41 transversely connected as at 42 to the looped or circular form of conduit 43 encircling the valve seat in the plane of closure member contact and provided on its inner periphery with a plurality of jets or holes 44. The latter are so positioned with respect to the main valve seat that jet streams of the cleaning fluid, such as high temperature steam will be directed across faces 17 and 18 and just prior to the valve closure member being seated.

A removable end plug 50 permits of the convenient installation of a suitable pressure gauge (not shown) if desired.

It should now be apparent that the flushing operation of the contact faces of the main valve seat and closure member is timed with the closing movement of the valve by means of the pawl surface 45 on the valve hinge (see FIG. 4) so that as the hinge extension 32 rotates in the valve closing direction the said pawl surface contact with the hinge cam surface 30 functions to trip the stem of the self-closing valve 33 and thus allow for a predetermined amount of steam to be applied momentarily and directed (while the spray valve is open) against the said valve seat and the closure member surfaces 17 and 18 respectively.

Actually, in service, it has been found that by employing one-half inch self-closing valve for the spray control and using 175 pounds steam pressure taken from the system itself, which can be supplied from the digester D itself, generally sufficient discharge of steam will take place through the spray holes 44 to provide what is termed a cyclone action.

It has also been found desirable in timing the operation of the spray valve with respect to the supplying of steam to the said casing and closure member seating surfaces that the spray valve 33 should open on that remaining half representative of the closing stroke of the valve. This arrangement provides a short and economical period of time for the seat cleaning, since it is self-closing, the spray valve will shut off the flushing supply just prior to the main valve closure member making its seat contact at 17. It should, of course, be understood that when opening the digester valve by means of the double-acting piston 23 as previously described, the pawl 35 (see FIG. 4) will be actuated by the hinge cam transverse surface adjoining the surface 30, but the resultant pivotal movement will not cause the spray valve stem 34 to be moved because the pawl surface now moves away from the end of the stem. Thus, it is preferred that the pawl 35 does not actuate the spray valve in the main valve opening movement. It will be understood that the actual operation insofar as timing of the valve seat cleaning mechanism is concerned depends to a large extent upon the speed of valve operation in the closing movement as accomplished by the double-acting air cylinder. Preferably, the timing of the spray valve is made adjustable. As shown more clearly in FIG. 5, in order to attach the loop conduit 43 firmly within the casing, a clamp member 45 is attached by a thumb-screw 46 to the lower portion of said casing. Obviously, other means for making such attachment may be provided.

Directing attention to FIG. 2, at the conduit 41, the usual stuffing bushing 47 and the packing ring 48 may be employed for effecting a fluid tight seal around the conduit.

Referring now to the same figure and specifically to the baffle 7 as hereinabove referred to, it has been found desirable that when the valve is in the wide open position, as indicated in the dotted lines in FIG. 2, to arrange for the baffle mounting as illustrated. Such arrangement prevents the formation and objectionable packing of pulp deposits in the cap corner and facilitates the movement of such deposits downwardly into the lower chamber portion of the valve and thence into the digester D. Insofar as the actual mounting of the closure member hinge 11 is concerned, this follows conventional pattern as shown in the cross-sectional view of FIG. 3, whereby the usual threaded plug 49 holds the said hinge in position against endwise movement, while at the opposite side of the casing a sleeve bushing 51 serves as a journalling means and is held firmly in shouldered position by means of the stuffing box 52, the gland 53, the gland flange 54, and the usual stuffing box studs and nuts 55 and 56, respectively.

It should be realized that valves of this type are of comparatively large size and may be of the order of 36 to 48 inches measured by pipe size. It will be appreciated that the matter of inspecting the valve seat conveniently as well as the closure member becomes desirable without the time consuming and costly operation of removing the valve from the pipe line or from between the hopper and the digester to make such inspection. In this case, as more clearly indicated in FIG. 1, the hinged flange cover 5 is easily removed because of being hingedly arranged to swing outwardly, as indicated, and the valve closure member 13 together with its hinged support 14 is moved to a position as indicated in said figure.

In order to make such removal and inspection even more easy to accomplish the hinged support at 56 apertured at 57 (FIG. 2) is provided with a lug 60 and eye bolt connection 57, whereby the chain A (see FIG. 1) fitted with a bolt clamp C may be suitably attached to an air hoist (not shown). Thus, the closure member and hinged support assembly may be lifted quickly and easily for such inspection and repair as deemed necessary.

Upon the completion of the inspection and repair operation, the valve may be suitably lowered and released from the hoist and then by actuating the double-acting cylinder 23 it can be drawn back to its seated position, as shown in solid lines in FIG. 2. It will, therefore, be apparent that the valve in addition to the novel seat flushing mechanism described has considerable utility from the standpoint of actual operation in an unusual service.

It will be appreciated that the particular embodiment may vary substantially from that illustrated without departing from the spirit of the invention as defined by the appended claims.

We claim:

1. In a swing gate valve or the like including a valve casing having an annular seat, a closure member hingedly mounted to predeterminately engage the said casing seat, valve means cooperating with an outer rotatable end portion of the hinged mounting of the closure member for initiating flow of flushing fluid at the said seat upon hinged movement of the said closure member in a valve closing direction whereby to predeterminately move a portion of said valve means upon rotation of said outer end portion of said hinged mounting.

2. In a swing gate valve, the combination of a casing having an annular valve seat, a valve closure member hingedly movable within the said casing for effecting fluid sealing contact with the said seat, and rotatable shaft means supporting the closure member actuated upon hinged movement of said closure member for predeterminately flushing the said seat, valve means actuated upon predetermined rotation of said shaft means, the latter shaft means including the structure by which said valve closure member is hinged within said casing, and having means rotatable therewith for cooperating with said valve means to effect said predetermined flushing.

3. In a swing gate valve of the character described, the combination of a casing having an annular valve seat, a valve closure member hingedly mounted within the casing for predeterminately effecting fluid sealing contact with the said seat, a rotatable shaft for effecting said hinged mounting of the closure member, projecting means on an end portion of said shaft cooperating with the said closure member for flushing the said seat, the said latter means including valve means operatively connected to said shaft and actuated by said projecting means on said end portion of said shaft upon the occurrence of predetermined swinging movement of the said valve closure member and rotation therewith of the said shaft.

4. The subject matter of claim 3, the rotative movement of the said shaft providing for the actuation of said valve means by said projecting means on the shaft, the said shaft projecting means being formed to contact a movable portion of the said valve means whereby to flush the said seat of the swing gate valve only in the closing direction of the said swing gate valve.

5. The subject matter of claim 4, the said projecting means for effecting the actuation of said seat flushing valve means including cam means on the shaft predeterminately contacting the said valve means and providing for flushing the said seat of the swing gate valve just prior to closing the said swing gate valve and upon predetermined rotation of the said shaft.

6. The subject matter of claim 4, the said seat flushing means having pivotally movable means directly actuated by the said rotatable shaft upon predetermined rotation of the said shaft forming the hinged mounting of the said closure member.

7. The subject matter of claim 6, cam means between the said shaft and the said valve means, the said cam means cooperating with the hinge mounting and the said pivotally movable means for actuating the said valve seat flushing means.

References Cited in the file of this patent
UNITED STATES PATENTS

| | | |
|---|---|---|
| 1,233,856 | Elder | July 17, 1917 |
| 1,802,205 | Fox | Apr. 21, 1931 |
| 1,839,092 | Feldmeier | Dec. 29, 1931 |
| 1,899,154 | Karrick | Feb. 28, 1933 |
| 2,833,511 | Fletcher | May 6, 1958 |